US007319381B2

(12) United States Patent
Shibata et al.

(10) Patent No.: US 7,319,381 B2
(45) Date of Patent: Jan. 15, 2008

(54) SIGNAL RECEIVING APPARATUS

(75) Inventors: Etsuya Shibata, Tokyo (JP); Hideki Yanagimoto, Tokyo (JP)

(73) Assignee: Alps Electric Co., Ltd., Tokyo (JP)

( * ) Notice: Subject to any disclaimer, the term of this patent is extended or adjusted under 35 U.S.C. 154(b) by 272 days.

(21) Appl. No.: 11/116,023

(22) Filed: Apr. 27, 2005

(65) Prior Publication Data

US 2005/0242961 A1 Nov. 3, 2005

(30) Foreign Application Priority Data

Apr. 30, 2004 (JP) ............................ 2004-136042

(51) Int. Cl.
*B60C 23/00* (2006.01)

(52) U.S. Cl. .................. 340/447; 340/446; 340/539.1; 340/653; 340/825.69; 340/5.61

(58) Field of Classification Search ................ 340/447, 340/446, 426.16, 539.1, 653, 657, 825.69, 340/5.61; 257/724, 748; 361/748, 760, 361/761, 764
See application file for complete search history.

(56) References Cited

U.S. PATENT DOCUMENTS 6,800,936 B2 * 10/2004 Kosemura et al. .......... 257/748
2001/0046126 A1 * 11/2001 Colello

FOREIGN PATENT DOCUMENTS

JP 6-117153 4/1994
JP 11-355022 12/1999

* cited by examiner

*Primary Examiner*—Hung Nguyen
(74) *Attorney, Agent, or Firm*—Brinks Hofer Gilson & Lione

(57) ABSTRACT

A signal receiving apparatus includes a receiving circuit board having a signal receiving circuit formed on one side of an insulating substrate, a wide conductive pattern formed on the other side of the insulating substrate that faces a forming position of the signal receiving circuit, and a printed radiating conductor formed on the other side of the insulating substrate deviated from a position that faces the forming position of the signal receiving circuit. In the signal receiving apparatus, an input stage of the signal receiving circuit, an output stage of the printed radiating conductor, and the wide conductive pattern are conductively connected on the receiving circuit board, and received signals are supplied to the signal receiving circuit, by using the printed radiating conductor and the wide conductive pattern as an antenna, through a conductive connection point thereof.

6 Claims, 4 Drawing Sheets

1
101
102
61
2
103
51
62
3
52
63
53
64
104
54
105
4

SIGNAL RECEIVING APPARATUS

This application claims the benefit of priority to Japanese Patent Application No. 2004-136042 filed on Apr. 30, 2004, herein incorporated by reference.

BACKGROUND OF THE INVENTION

1. Field of the Invention

The present invention relates to a signal receiving apparatus suitable for use in an in-vehicle apparatus of a remote keyless entry (RKE), and more specifically, to a signal receiving apparatus in which, when a receiving circuit board having an antenna pattern thereon is provided, the antenna pattern is formed such that circularly polarized radio wave signals can be received, thereby obtaining a small and light signal receiving apparatus.

2. Description of the Related Art

Conventionally, a remote keyless entry includes one or more portable transmitters that users individually keep and one or more in-vehicle receivers mounted on a vehicle. With control of any of the portable transmitters, radio signals are transmitted from the portable transmitter, and when the in-vehicle receiver receives the radio signal, the in-vehicle receiver checks whether the portable transmitter that transmitted an ID code included in the radio signal has already registered the ID code onto the in-vehicle receiver, and when it is checked that the ID code has been registered, the in-vehicle receiver supplies a control signal to a controlled unit of the vehicle indicated by a control code, using the control code included in the radio signal. For example, in a door lock apparatus, by providing a door unlock signal, the door lock apparatus is changed from a lock state to an unlock state.

In this case, the radio signal transmitted from the portable transmitter to the in-vehicle receiver is typically in a frequency range of 300 MHz to 500 MHz, and in addition, a transmission power of the radio signal is considerably small. To this end, for the in-vehicle receiver, a high sensitive receiving antenna for use in the in-vehicle receiver, in particular, a relatively large antenna is used so as to precisely receive the radio signal transmitted from the portable transmitter.

FIG. 3 is a plan view showing an example of the conventional antenna arrangement that can be used in this type of in-vehicle receiver, disclosed in Japanese Unexamined Patent Application Publication No. 11-355022, and FIG. 4 is an exploded perspective view showing another example of the conventional antenna arrangement that can be used in this type of in-vehicle receiver in the same manner, disclosed in Japanese Unexamined Patent Application Publication No. 06-117153.

As shown in FIG. 3, the antenna has a front chassis 31 in a thin box shape, a bottom chassis 32 in a thin box shape, a printed board 34 supported by supporting units 33 in a box space surrounded by the front chassis 31 and the bottom chassis 32, and a plate 35 fixedly attached at two spots 36 and 37 in an inverse L-shape with respect to the printed board 34, and the printed board 34 has an opening 38 in a portion facing the plate 35. Therefore, one spot 36 where the printed board 34 and the plate 35 are fixedly attached to each other forms an electrical connection terminal to the printed board 34, and the other spot 37 where the printed board 34 and the plate 35 are fixedly attached forms a grounded terminal. In the antenna arranged as described above, the plate 35 is used as an antenna element, so that an antenna having a relatively high sensitivity can be obtained which results in increasing the size thereof as a whole.

In addition, as shown in FIG. 4, the antenna is a pattern antenna 42 in which the length of the antenna mounted on the circuit board 41 is (¼) λ, and further, the circuit board 41 has a control circuit unit 43, an external capacitor 44, a high frequency input terminal 45, an antenna side wiring 46 that connects a pattern antenna 42 with one end of the capacitor 44, and a circuit unit side wiring 47 that connects the control circuit unit 43, the capacitor 44, and the high frequency input terminal 45. The antenna arranged as described above uses the pattern antenna 42 as an antenna element, so that the size can be reduced and thus the receiving signal directivity of the antenna is strong in one direction.

Recently, a remote keyless entry is proposed that acts as the remote keyless entry as described above as well as detects a tire pressure of a tire using a tire pressure sensor, supplies to a signal receiving apparatus a signal representing a detection result of the tire pressure as a radio signal, and processes the detection signal received by the signal receiving apparatus using the in-vehicle receiver, and thus is capable of detecting the tire pressure of the vehicle all the time.

The remote keyless entry proposed herein mounts on each tire of the vehicle the tire pressure sensor that detects an air pressure of the tire and a radio signal transmitter, respectively, mounts on the side of the vehicle signal receiving apparatuses that individually receive the respective radio signals, wirelessly transmits radio signals as detection signals detected by the respective tire pressure sensors from the corresponding radio signal transmitters, and allows the corresponding signal receiving apparatuses to receive the radio signals transmitted from the radio signal transmitters.

Therefore, the signal receiving apparatus described above requires an antenna that receives the radio signal in the same manner as in the in-vehicle receiver described above. Thus, the respective radio signal transmitters are mounted on rims of the corresponding tires, and the respective signal receiving apparatuses are mounted in corresponding wheel houses, so that a gap between the radio signal transmitter and the signal receiving apparatus is 10 to 15 cm in the nearest state to each other and 50 to 60 cm in the farthest state. To this end, although these signal receiving apparatuses do not need to use an antenna having high receiving sensitivity as disclosed in the above-mentioned Japanese Unexamined Patent Application Publication No. 11-355022, if the antenna having high receiving sensitivity is used like this, the mounting spot is restricted when mounting the signal receiving apparatuses on the vehicle as well as it is difficult to use when the receiving sensitivity is too high. Therefore, it is difficult for the above-mentioned antenna to be used in this type of signal receiving apparatus.

In addition, for the signal receiving apparatus described above, since the position of a signal source of a radio signal received by the signal receiving apparatus, or the position of the radio signal transmitter is changed as the tire rotates, it is necessary that the antenna have the receiving directivity so as to receive the radio signal transmitted from the radio signal transmitter all the time even though the position of the radio signal transmitter is changed. By the way, when the antenna is used as disclosed in the above-mentioned Japanese Unexamined Patent Application Publication No. 06-117153, the arrangement of the antenna is in a state where a receiving sensitivity for a horizontally polarized wave of the radio signal and a receiving sensitivity for a vertically polarized wave are significantly different, that is, a state where circularly polarized wave signals can not be received. For this reason, when the radio signal transmitter is placed in a predetermined range and direction with respect to the signal receiving apparatus, the receiving sensitivity of the antenna with respect to the radio signal transmitted from the radio signal transmitter is increased and thus the signal receiving apparatus may correctly receive the radio signal, however, in a moment that radio signal transmitter is out of the range with respect to the signal receiving apparatus, the receiving sensitivity of the antenna with respect to the radio signal transmitted from the radio signal transmitter is decreased and thus the signal receiving apparatus may not correctly receive the radio signal, so that it is difficult for the antenna described above to be used in this type of signal receiving apparatus.

SUMMARY OF THE INVENTION

The present invention is designed to solve the above-mentioned problems, and it is an object of the present invention to provide a signal receiving apparatus in which circularly polarized wave signals of radio signals can be effectively received by properly selecting arrangement shape of an antenna pattern, and of which size is small and of which price is low by use of the antenna pattern.

In order to achieve the above-mentioned object, according to an aspect of the invention, a signal receiving apparatus includes: a receiving circuit board having a signal receiving circuit formed on one side of an insulating substrate, a wide conductive pattern formed on the other side of the insulating substrate that faces a forming position of the signal receiving circuit, and a printed radiating conductor formed on the other side of the insulating substrate deviated from a position that faces the forming position of the signal receiving circuit. In the signal receiving apparatus, an input stage of the signal receiving circuit, an output stage of the printed radiating conductor, and the wide conductive pattern are conductively connected on the receiving circuit board, and received signals are supplied to the signal receiving circuit, by using the printed radiating conductor and the wide conductive pattern as an antenna, through a conductive connection point thereof.

Further, in the above signal receiving apparatus, preferably, a surface acoustic wave filter (hereinafter "SAW" filter) is arranged on the one side of the insulating substrate in the receiving circuit board, and one end of the SAW filter is connected to the output stage of the printed radiating conductor and the other end of the SAW filter is connected to the input stage of the signal receiving circuit, respectively.

Furthermore, in the above signal receiving apparatus, preferably, a plurality of filter elements are arranged on the other side of the insulating substrate in the receiving circuit board, one of the plurality of filter elements is connected between an external ground terminal and the conductive pattern, and remaining filter elements of the plurality of filter elements are arranged between corresponding external connection terminals and corresponding connection ends of the signal receiving circuit, respectively.

Moreover, in the above signal receiving apparatus, preferably, the printed radiating conductor is formed in a winding shape.

In addition, in the above signal receiving apparatus, preferably, the printed radiating conductor and the conductive pattern formed on the other end of the insulating substrate are formed such that these shapes are arranged to have a function as an antenna pattern that receives circularly polarized wave radio signals.

Further, in the above signal receiving apparatus, preferably, the signal receiving circuit is used to receive radio signals including a detection signal obtained from a tire pressure sensor that detects a tire pressure of the vehicle and the receiving circuit board is mounted on the vehicle so that directivity of the radio signal received by the receiving circuit board is in a direction connecting a grounded surface of the tire to the uppermost portion.

As described above, in the signal receiving apparatus according to the aspect of the invention, a receiving circuit board is provided in which the signal receiving circuit is formed on one end of the insulating substrate, the wide pattern and the printed radiating conductor are formed on the other side of the insulating substrate, and the input stage of the signal receiving circuit, the output stage of the printed radiating conductor, and the wide conductive pattern are conductively connected, and the printed radiating conductor and the conductive pattern, serving as an antenna, provide the received signals to the signal receiving circuit through a conductive connection point. Therefore, with the wide conductive pattern cooperating with the printed radiating conductor, it is possible to receive the horizontally polarized wave signal and the vertically polarized wave signal of the radio signal, and accordingly the signal receiving apparatus having a small and inexpensive antenna can be obtained.

Further, in the signal receiving apparatus according to the aspect of the invention, the SAW filter is arranged on the one side of the insulating substrate, and one end of the SAW filter is connected to the output stage of the printed radiating conductor and the other end of the SAW filter is connected to the input stage of the signal receiving circuit, respectively, so that unnecessary signal components transferred from the printed radiating conductor to the signal receiving circuit can be blocked and thus the signal leakage can be reduced.

Furthermore, in the signal receiving apparatus according to the aspect of the invention, a plurality of filter elements are arranged, and one of the plurality of filter elements are connected between the external ground terminal and the conductive pattern, and the remaining filter elements of the plurality of filter elements are connected between the corresponding external connection terminals and the corresponding connection ends of the signal receiving circuits, respectively, so that the conductive pattern can be separated from the connection point with respect to the high frequency. Accordingly, the conductive pattern can be used as an antenna.

Moreover, in the signal receiving apparatus according to the aspect of the invention, the printed radiating conductor is formed in a winding shape, so that the length of the printed radiating conductor is substantially reduced and thus a small antenna can be obtained.

In addition, in the signal receiving apparatus according to the aspect of the invention, the arrangement of the conductive pattern and the printed radiating conductor formed on the insulating substrate is properly selected and the circularly polarized wave radio signal can act as an antenna pattern, so that the small and inexpensive antenna can be obtained.

Further, in the signal receiving apparatus according to the aspect of the invention, the signal receiving circuit is used to receive the radio signal including the detection signal obtained by the tire pressure sensor that detects the tire pressure of the vehicle, and the receiving circuit board is mounted on the vehicle such that directivity of the radio signal received by the receiving circuit board is in a direction connecting a grounded surface of the tire to the uppermost portion thereof, so that the receiving directivity of the antenna of each signal receiving circuit is in a range where only the corresponding radio signal transmitter is placed in sight all the time. Thus, the signal receiving circuit having high accuracy, when receiving the radio signal, can be obtained.

DESCRIPTION OF THE PREFERRED EMBODIMENT

Hereinafter, an exemplary embodiment of the present invention will be described with reference to the accompanying drawings.

Figure 1A:
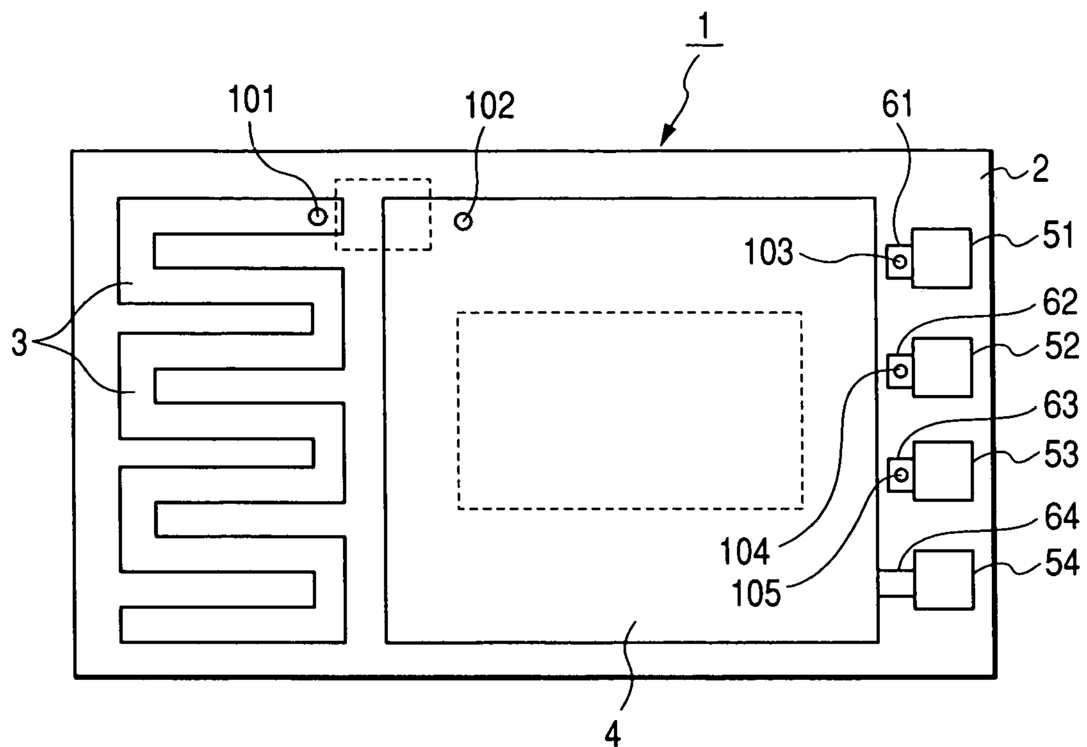
FIGS. 1A and 1B are plan views showing schematic configurations of a receiving circuit board of a signal receiving apparatus according to an embodiment of the present invention.
Figure 1B:
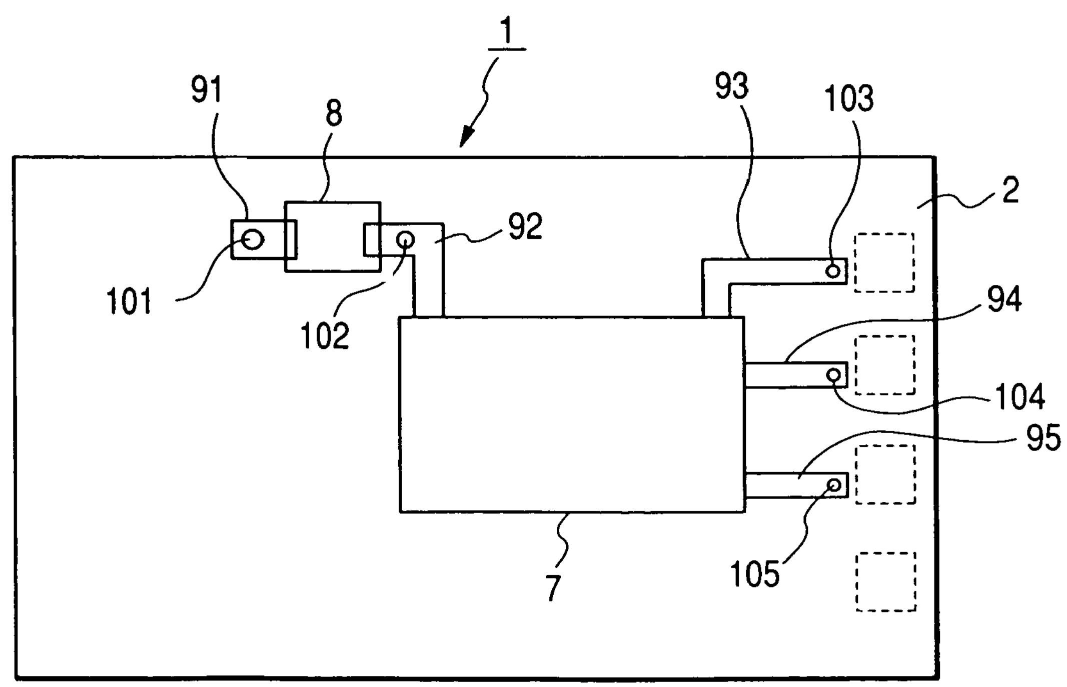

FIGS. 1A and 1B are plan views showing schematic configurations of a receiving circuit board of a signal receiving apparatus according to an embodiment of the invention, in which FIG. 1A is a configuration of one side thereof and FIG. 1B is a configuration of the other side thereof.

As shown in FIGS. 1A and 1B, in a receiving circuit board 1 used for the signal receiving apparatus according to the embodiment, on one surface of the insulating substrate 2, a printed radiating conductor 3 formed in a winding shape, a wide conductive pattern 4, four chip bead filters 51, 52, 53 and 54, three connection patterns 61, 62 and 63 respectively extending from three chip bead filters 51, 52 and 53, and one connection pattern 64 extending from one chip bead filter 54 to the wide conductive pattern 4 are arranged.

In addition, on the other side of the insulating substrate 2, a signal receiving circuit 7, a SAW (surface acoustic wave) filter 8, one connection pattern 91 extending from one end of the SAW filter 8, one connection pattern 92 extending from one end of the SAW filter 8 to the wide conductive pattern 4, and three connection patterns 93, 94 and 95 respectively extending from the wide conductive pattern 4 are arranged.

In addition, through the insulating substrate 2, five through conductors 101, 102, 103, 104 and 105 are arranged. Among these, the through conductor 101 is conductively connected to one end of the printed radiating conductor 3 at one side of the insulating substrate 2 and connected to the connection pattern 91 at the other side of the insulating substrate 2, respectively, and the through conductor 102 is conductively connected to end portion of the wide conductive pattern 4 at one side of the insulating substrate 2 and connected to the connection pattern 92 at the other side of the insulating substrate 2, respectively. The through conductor 103 is conductively connected to the connection pattern 61 at one side of the insulating substrate 2 and connected to the connection pattern 93 at the other side of the insulating substrate 2, respectively, and the through conductor 104 is conductively connected to the connection pattern 62 at one side of the insulating substrate 2 and connected to the connection pattern 94 at the other side of the insulating substrate 2, respectively, and the through conductor 105 is connected to the connection pattern 63 at one side of the insulating substrate 2 and connected to the connection pattern 95 at the other side of the insulating substrate 2, respectively.

Further, for one side of the insulating substrate 2, the printed radiating conductor 3 and the wide conductive pattern 4 are adjacently arranged, and the winding portion of the printed radiating conductor 3 is arranged along one short edge of the conductive pattern 4, and four chip bead filters 51, 52, 53 and 54 are arranged along the other short edge of the conductive pattern 4. In addition, for the other side of the insulating substrate 2, the signal receiving circuit 7 is arranged at a location that faces an arranging location of the conductive pattern 4 through the insulating substrate 2, and the SAW filter 8 is separated a bit from the signal receiving circuit 7.

For the receiving circuit board 1 arranged as described above, the wide conductive pattern 4 is connected to the external connection terminal through four chip bead filters 51, 52, 53 and 54 (the external connection terminal is a terminal that connects the receiving circuit board 1 to an in-vehicle receiver, etc. of a remote keyless entry, which is not shown in FIG. 1), and with this, the wide conductive pattern 4 is isolated from a ground point at high frequencies, and in addition, the wide conductive pattern 4 is connected to an input stage of the signal receiving circuit 7 through the through conductor 102. For this reason, the printed radiating conductor 3 and the wide conductive pattern 4 cooperatively constitute an antenna pattern of the radio signal supplied to the signal receiving circuit 7.

In this case, for the antenna pattern constituted by the printed radiating conductor 3 and the wide conductive pattern 4, the winding portion of the printed radiating conductor 3 is arranged along a short edge of the conductive pattern 4, so that there is a strong tendency in that the printed radiating conductor 3 can receive one polarized wave signal of the radio signal, e.g., a horizontally polarized wave signal, and the wide conductive pattern 4 can receive the other polarized wave signal of the radio signal, e.g., a vertically polarized wave signal, and accordingly as a whole, a proper arrangement is provided in which the circularly polarized wave signal of the radio signal is received. Thereby, the radio signal that reaches the antenna pattern can be efficiently received as a circularly polarized wave signal. Further, the signal received in the antenna pattern is amplified and demodulated in the signal receiving circuit 7, and the demodulated signal is carried to the in-vehicle receiver of the remote keyless entry next to the signal receiving circuit 7.

Furthermore, while the present embodiment has been described in the context that a pattern having a winding shape is used as the printed radiating conductor 3, the printed radiating conductor 3 according to the present invention is not limited thereto, but the pattern may have a comb shape or a whorl shape as long as there is a strong tendency in that one polarized wave signal of the radio signal can be received.

In addition, while the present embodiment has been described in the context that the SAW filter 8 is arranged at the other side of the insulating substrate 2, the present invention is not limited thereto, but other high frequency filters can be used as long as they have function equivalent to that of the SAW filter 8.

In addition, while the present embodiment has been described in the context that the chip bead filters 51, 52, 53 and 54 are used to separate the wide conductive pattern 4 from the ground point at high frequencies, the present invention is not limited thereto, but other small filters can be used as long as they have function equivalent to that of the chip bead filters.

Figure 2:
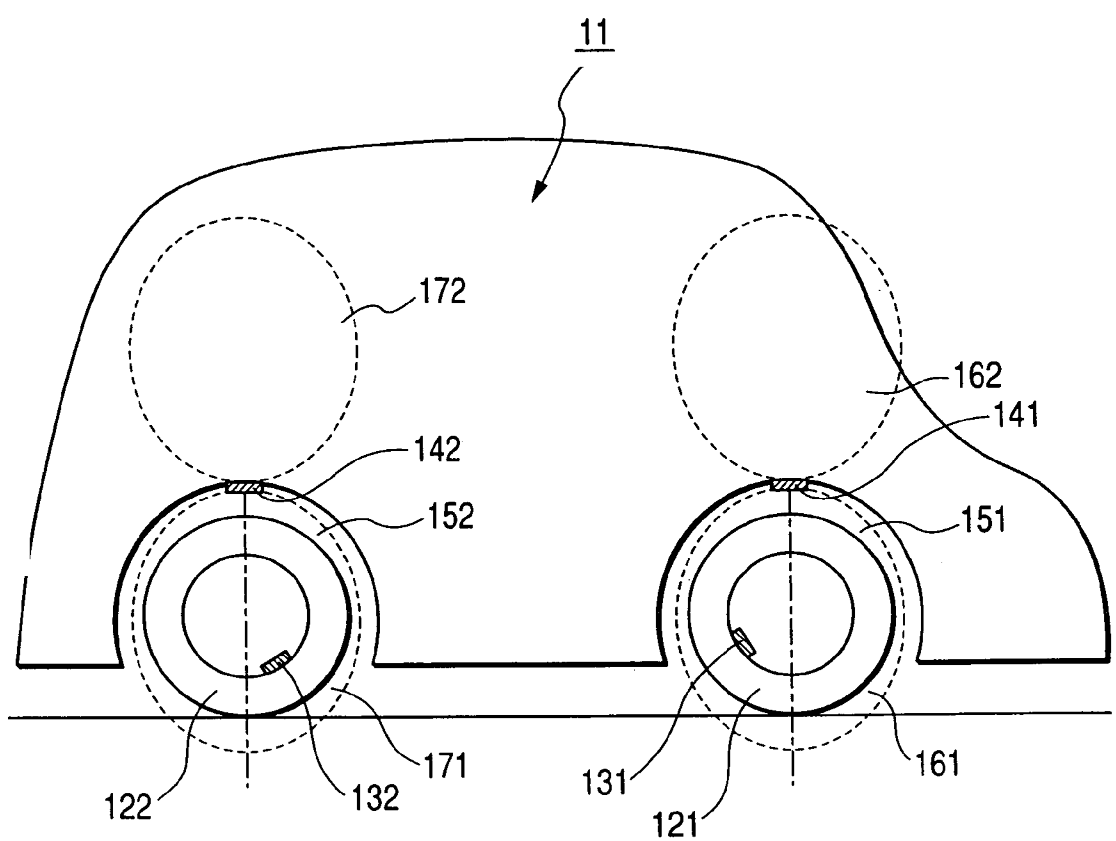
FIG. 2 is a diagram showing an arrangement suitable for a case where the signal receiving circuit shown in FIG. 1 receives radio signals including a detection signal obtained by a tire pressure sensor that detects a tire pressure of a vehicle.
Figure 3:
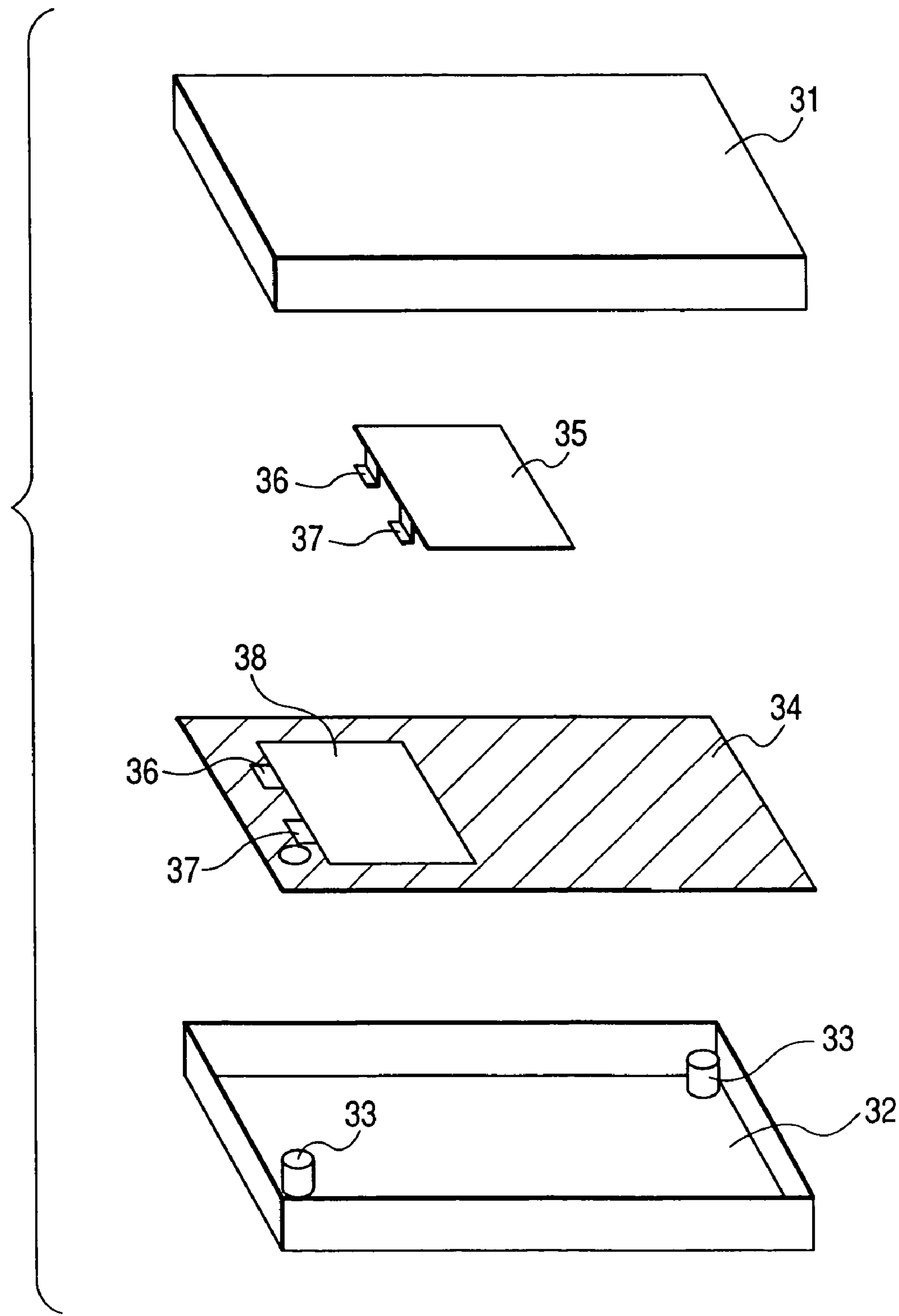
FIG. 3 is a plan view showing an exemplary configuration of a conventional antenna that can be used in an in-vehicle receiver.
Figure 4:
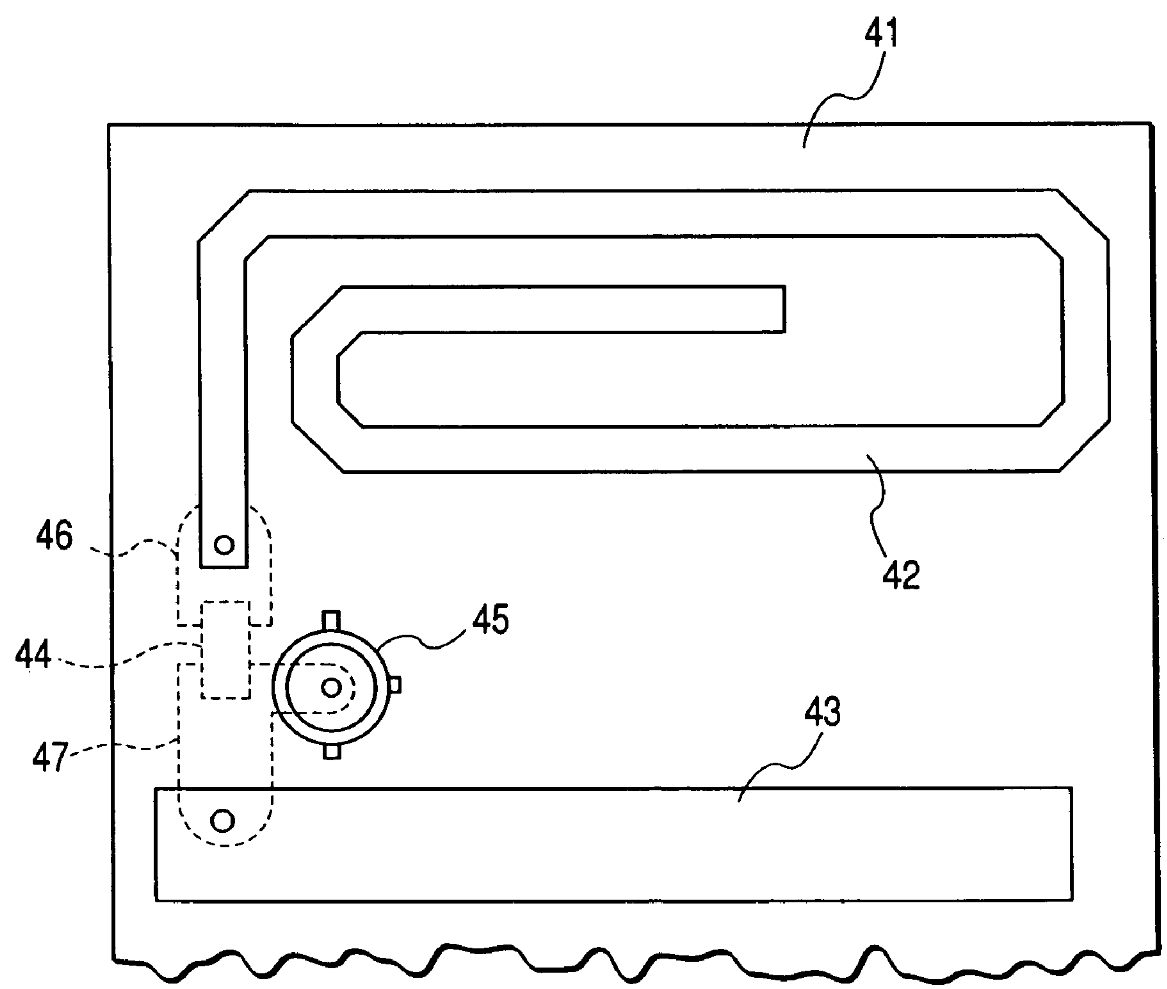
FIG. 4 is an exploded perspective view showing another exemplary configuration of a conventional antenna that can be used in an in-vehicle receiver.

Next, FIG. 2 is a diagram showing an arrangement suitable for a case where the signal receiving circuit shown in FIG. 1 receives a radio signal including the detection signal obtained by the tire pressure sensor that detects the tire pressure of the vehicle.

As shown in FIG. 2, with this arrangement, radio signal transmitters 131 and 132 having the tire pressure sensor are mounted on rim portions of the tire 121 and 122 of the vehicle 11 respectively, and the signal receiving apparatuses 141 and 142 are mounted on the uppermost portion of the wheel houses 151 and 152 for each of the radio signal transmitters 131 and 132, respectively. In this case, when the signal receiving apparatuses 141 and 142 are mounted on the wheel houses 151 and 152, the mounting direction of the signal receiving apparatuses 141 and 142 is selected such that the directivity of the radio signal received by the antenna constituted by the printed radiating conductor 3 and the wide conductive pattern 4 is in directions 161, 162, 171 and 172 as shown in a dotted line of FIG. 2.

In other words, each of the signal receiving apparatuses 141 and 142 is mounted on the uppermost portion of the wheel houses 151 and 152 facing the uppermost portions of the corresponding tires 121 and 122, and each of the signal receiving apparatuses 141 and 142 is mounted on the wheel houses 151 and 152 such that the directivity of the radio signals received by the antennas of these signal receiving apparatuses 141 and 142 is in a line connecting the ground point of the tires 121 and 122 to the uppermost portions thereof. In addition, while FIG. 2 shows that the vehicle 11 has only two tires 121 and 122, in the same manner as two tires 121 and 122, the radio signal transmitters and the signal receiving apparatuses are also mounted on the other two tires, which are not shown, respectively.

With the arrangement described above, the radio signal transmitter 131 intermittently detects an air pressure of the tire using the tire pressure sensor, and the detection signal showing the detection result is transmitted to the signal receiving apparatus 141 as a radio signal. At this time, the signal receiving apparatus 141 receives the radio signal transmitted from the radio signal transmitter 131 using the antenna, and the received signal is amplified and demodulated by the signal receiving circuit 7 to form the demodulation signal, and the demodulated signal is supplied to the in-vehicle receiver of the remote keyless entry. In the same manner as above, the radio signal transmitter 132 intermittently detects an air pressure of the tire using the tire pressure sensor, and the detection signal showing the detection result is transmitted to the signal receiving apparatus 142 as a radio signal. At this time, the signal receiving apparatus 142 receives the radio signal transmitted from the radio signal transmitter 132 using the antenna, and the received signal is amplified and demodulated by the signal receiving circuit 7 to form the demodulation signal, and the demodulated signal is supplied to the in-vehicle receiver of the remote keyless entry. In addition, for the other two radio signal transmitters and two signal receiving apparatuses, the same operations as described above can be performed.

In this case, for each of the radio signal transmitters 131 and 132, a timing, where the detection signal that detects the air pressure of the tire is generated, is a bit different, respectively, and the demodulation signal output from each of the signal receiving apparatuses 141 and 142 is also supplied to the in-vehicle receiver of the remote keyless entry in a time multiplexing manner. Further, when there is any tire of which air pressure is out of normal range based on the signal contents of the respective demodulated signals, the in-vehicle receiver, which receives the demodulated signal, can notify a user that the air pressure of the tire is out of the normal range by means of a display and the like.

With the arrangement described above, the signal receiving apparatuses 141 and 142 are mounted on the uppermost portions of the wheel houses 151 and 152, and mounting directions of these signal receiving apparatuses 141 and 142 are determined such that the directivity of the radio signals received by the antenna is in directions 161, 162, 171 and 172 toward a line direction connecting the ground surfaces of the tires 121 and 122 to the uppermost portions, so that even when the radio signal transmitters 131 and 132 mounted on rims of the tires 121 and 122 change positions as the tires 121 and 122 rotate, they are always in a range of the directions 161 and 171. Accordingly, either when the radio signals transmitted from the radio signal transmitters 131 and 132 are received by using the antennas of the signal receiving apparatuses 141 and 142 or when the radio signals transmitted from the adjacent radio signals is erroneously received, an unexpected event can be prevented that the radio signal transmitted from either of the radio signal transmitters cannot be received.

What is claimed is:

1. A signal receiving apparatus comprising:

a receiving circuit board having a signal receiving circuit formed on one side of an insulating substrate, a wide conductive pattern formed on another side of the insulating substrate that faces a forming position of the signal receiving circuit, and a printed radiating conductor formed on the another side of the insulating substrate deviated from a position that faces the forming position of the signal receiving circuit, wherein an input stage of the signal receiving circuit, an output stage of the printed radiating conductor, and the wide conductive pattern are conductively connected on the receiving circuit board, and received signals are supplied to the signal receiving circuit, by using the printed radiating conductor and the wide conductive pattern as an antenna, through a conductive connection point thereof.

2. The signal receiving apparatus according to claim 1, wherein, in the receiving circuit board, a surface acoustic wave (SAW) filter is arranged on the one side of the insulating substrate, and one end of the SAW filter is connected to the output stage of the printed radiating conductor and another end of the SAW filter is connected to the input stage of the signal receiving circuit, respectively.

3. The signal receiving apparatus according to claim 1, wherein, in the receiving circuit board, a plurality of filter elements are arranged on another side of the insulating substrate, one of the plurality of filter elements is connected between an external ground terminal and the conductive pattern, and the remaining filter elements of the plurality of filter elements are arranged between corresponding external connection terminals and corresponding connection ends of the signal receiving circuit, respectively.

4. The signal receiving apparatus according to claim 1, wherein the printed radiating conductor is formed in a winding shape.

5. The signal receiving apparatus according to claim 1, wherein the conductive pattern and the printed radiating conductor formed on another side of the insulating substrate are arranged to serve as an antenna pattern that receives circularly polarized wave signals.

6. The signal receiving apparatus according to claim 5, wherein the signal receiving circuit is used to receive radio signals including a detection signal obtained from a tire pressure sensor that detects a tire pressure of a vehicle, and the receiving circuit board is mounted on the vehicle such that directivity of the radio signal received by the receiving circuit is in a direction connecting a grounded surface of the tire to the uppermost portion thereof.

* * * * *

UNITED STATES PATENT AND TRADEMARK OFFICE

CERTIFICATE OF CORRECTION

PATENT NO. : 7,319,381 B2
APPLICATION NO. : 11/116023
DATED : January 15, 2008
INVENTOR(S) : Etsuya Shibata et al.

It is certified that error appears in the above-identified patent and that said Letters Patent is hereby corrected as shown below:

In the Claims

Column 9, in claim 5, line 3, after “conductor formed on” insert --the--.

Signed and Sealed this

Twenty-fourth Day of June, 2008

JON W. DUDAS
*Director of the United States Patent and Trademark Office*